(12) United States Patent
Kress

(10) Patent No.: US 6,305,245 B1
(45) Date of Patent: Oct. 23, 2001

(54) MULTIPLE LUG NUT REMOVAL TOOL

(76) Inventor: Joseph M. Kress, P.O. Box 3834, Erie, PA (US) 16508

( * ) Notice: Subject to any disclaimer, the term of this patent is extended or adjusted under 35 U.S.C. 154(b) by 0 days.

(21) Appl. No.: 09/641,464

(22) Filed: Aug. 18, 2000

(51) Int. Cl.[7] ................................................ B25B 23/02
(52) U.S. Cl. ............................................ 81/57.22; 81/57.14
(58) Field of Search ............................. 81/54–57, 57.14, 81/57.22, 57.29, 57.31, 57.32, 57.36

(56) References Cited

U.S. PATENT DOCUMENTS

| | | | |
|---|---|---|---|
| 2,069,882 | * | 2/1937 | Hall ....................................... 81/57.22 |
| 3,905,254 | * | 9/1975 | Palatnick et al. ...................... 81/57.3 |
| 4,063,475 | * | 12/1977 | Perkins ................................. 81/57.22 |
| 4,274,310 | * | 6/1981 | Michaud ............................... 81/57.36 |
| 5,074,170 | * | 12/1991 | Shirley ................................... 81/57.3 |
| 5,277,085 | * | 1/1994 | Tanimura et al. .................... 81/57.22 |
| 5,572,905 | * | 11/1996 | Cook, Jr. ................................ 74/411 |
| 6,134,989 | * | 10/2000 | Stevens ................................ 81/57.22 |

* cited by examiner

Primary Examiner—Joseph J. Hail, III
Assistant Examiner—David B Thomas
(74) Attorney, Agent, or Firm—Richard K. Thomson

(57) ABSTRACT

A housing has five sockets extending beyond the front face thereof, spaced to simultaneously engage the lug nuts securing a wheel to a vehicle. Each socket has secured to a peripheral portion a satellite gear that engages a universal gear. The universal gear has a drive surface allowing it to be driven in a conventionally opposite direction to simultaneously remove the lug nuts and then driven in the opposite rotational direction by a pneumatic wrench to simultaneously secure the lug nuts securing the replacement wheel to the vehicle, greatly reducing the time needed for a wheel/tire change. This tool has the potential for greatly reducing the time required for a pit stop in stock car racing giving a huge advantage to the team so equipped.

9 Claims, 5 Drawing Sheets

MULTIPLE LUG NUT REMOVAL TOOL

BACKGROUND OF THE INVENTION

The present invention is directed to a tool that enables all lug nuts holding a wheel to an axle to be simultaneously removed.

In stock car racing, the automobile may not be significantly modified from the "off the floor" condition which is sold in show rooms. So unlike the Indy car where a single nut can be used for attachment, the wheels must be attached with all lug nuts (sometimes 4 or more typically, 5). Accordingly, in racing stock cars, the removal and replacement of the wheels become a key rate-determinative factor in completion of a pit stop. One way pit crews attempt to reduce the turn around time is to cement the lug nuts to the replacement wheel to eliminate handling the lug nuts during replacement. In addition, ¼" to ½" of the threads are ground off the lead end of the studs so that the cemented lugs can seat on the stud and not simply be knocked loose as the replacement wheel is mounted.

Still, in an industry where winning and losing can be determined by tenths of a second spent in the pit, it would be of significant benefit to be able to remove multiple lug nuts, preferably, all five, at the same time. A racing team which had such a tool might save 2–4 seconds each pit stop, a tremendous advantage in an arena where races are frequently decided by tenths of a second.

The present invention provides such a removal tool enabling all five lug nuts to be simultaneously removed. The tools comprises multiple individual socket assemblies for simultaneously engaging each lug nut that attaches a wheel to a vehicle, each socket including a nut-engaging socket and a satellite gear attached to each of said individual nut-engaging sockets for rotationally driving said individual nut-engaging socket in both rotational directions; a universal drive gear engaging each of said satellite gears for simultaneously rotating all of said individual socket assemblies in either of said rotational directions; a housing including an inner plate, an outer plate and a peripheral wall extending between said inner plate and said outer plate, said housing encasing said satellite gears and said universal gear; a drive surface attached to said universal drive gear; whereby a pneumatic wrench may engage said drive surface and simultaneously remove and replace all lug nuts securing the wheel.

Each socket includes a locator pin that is received in an aperture in the outer plate. The housing is generally pentagonal to accommodate the five lug nuts, providing adequate structure to support the five sockets without adding excessive additional weight. The sockets preferably are 12 or 24 point in order to facilitate positioning on the lug nuts. The drive surface may be either a recess or an integral shaft which can be engaged by a pneumatic wrench. The wrench will be operated in the reverse direction from normal since the universal gear will rotate the satellite gears in the opposite rotational direction from the direction the wrench operates.

Various other features, advantages and characteristics of the present invention will become apparent to one of ordinary skill in the art after a reading of the following specification.

BRIEF DESCRIPTION OF THE DRAWINGS

The preferred embodiments(s) of the present invention is/are described in conjunction with the associated drawings in which like features are indicated with like reference numerals and in which.

DETAILED DESCRIPTION OF PREFERRED EMBODIMENT(S)

Figure 1:
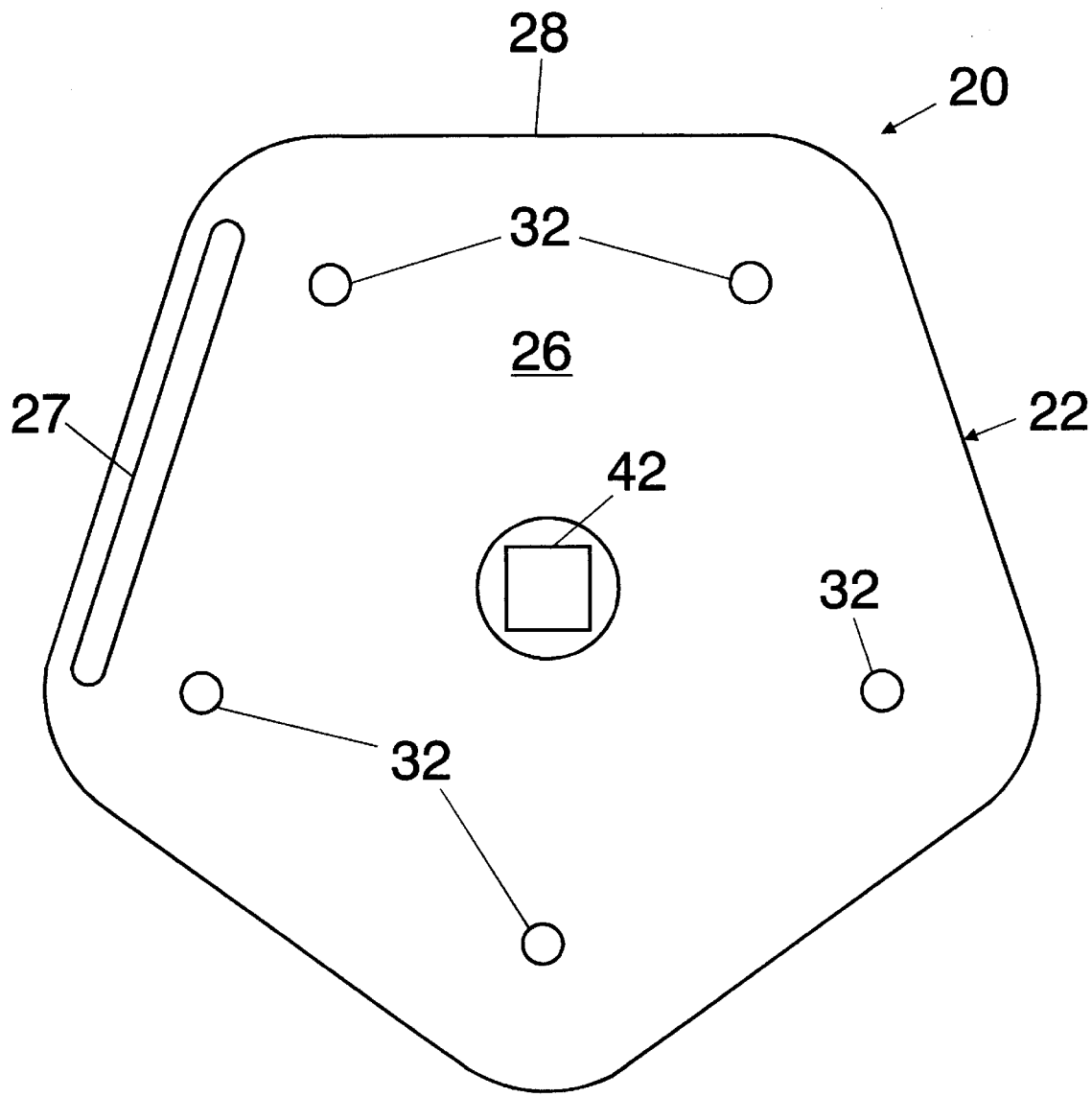
FIG. 1 is a back view of a first embodiment of the multiple lug nut removal tool of the present invention.
Figure 2:
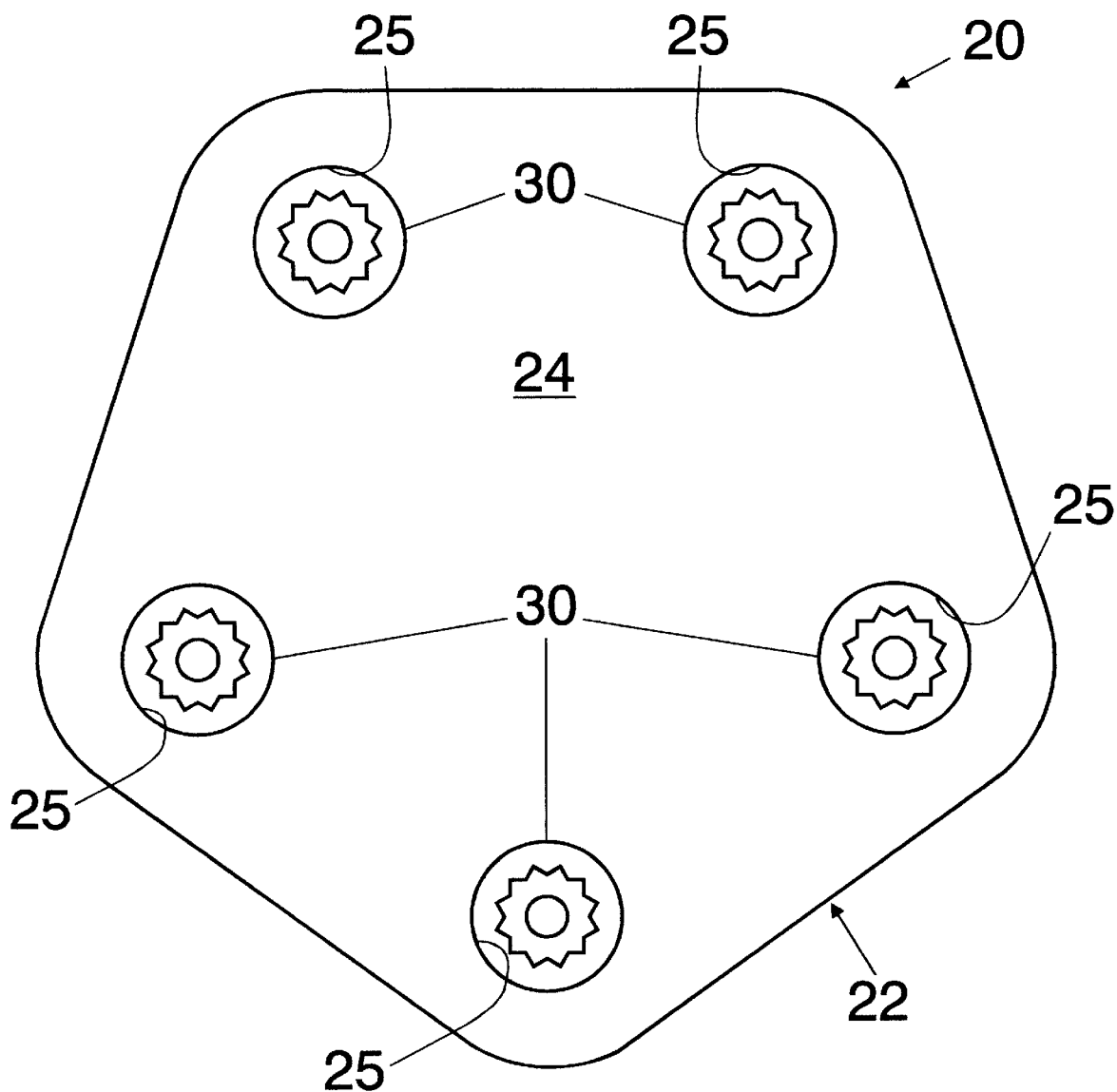
FIG. 2 is a front view of the first embodiment.
Figure 3:
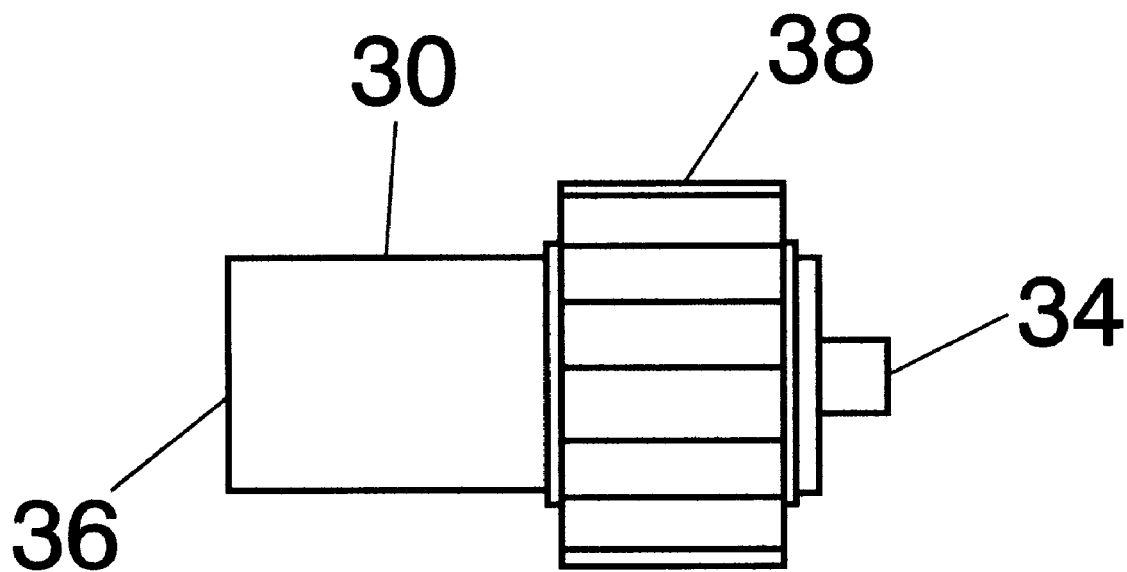
FIG. 3 is a side view of an individual socket employed in the first embodiment.
Figure 5:
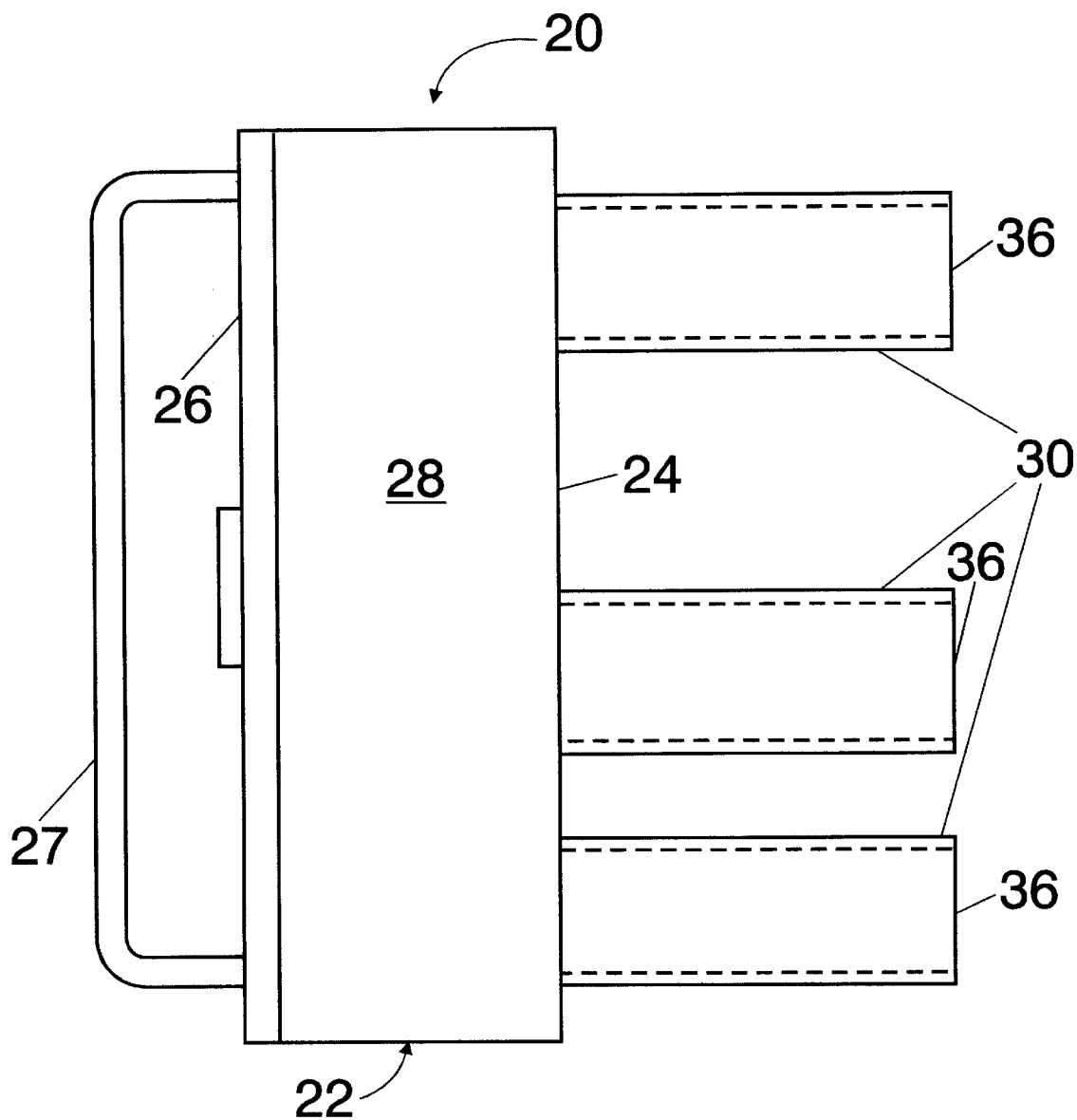

A first embodiment of the multiple lug nut removal tool of the present invention is shown in FIGS. 1, 2 and 5 generally at 20. Removal tool 20 comprises a generally pentagonal housing 22 having a front wall or plate 24, a back plate 26, and a side wall 28. Normally, front plate 24 and side wall 28 will be made integrally as a unit with the back wall 26 being attached by small screws (not shown). Five separate sockets 30 are provided, spaced to engage the five lug nuts (not shown) securing the wheel. Five locator apertures 32 are formed in the back plate 26 each of which receives a locator pin 34 (FIG. 3) integral with the sockets 30 opposite the lug engaging end 36. Five socket receiving apertures 25 are formed in the front plate 24 to permit the front portions of sockets 30 to protrude beyond the front plate 24 (see FIG. 5). These recesses 25 may be equipped with conventional bearing means (not shown) to facilitate rotation of sockets 30 therein. The lug engaging end 36 of each socket 30 is equipped with an internal drive which is preferably either a 12 or 24 point socket to facilitate the engagement with the lug nuts without having to disengage the socket drive gears to be subsequently described. Handle 27 is secured to back plate 26 to facilitate gripping and manipulation of removal tool 20.

Figure 4:
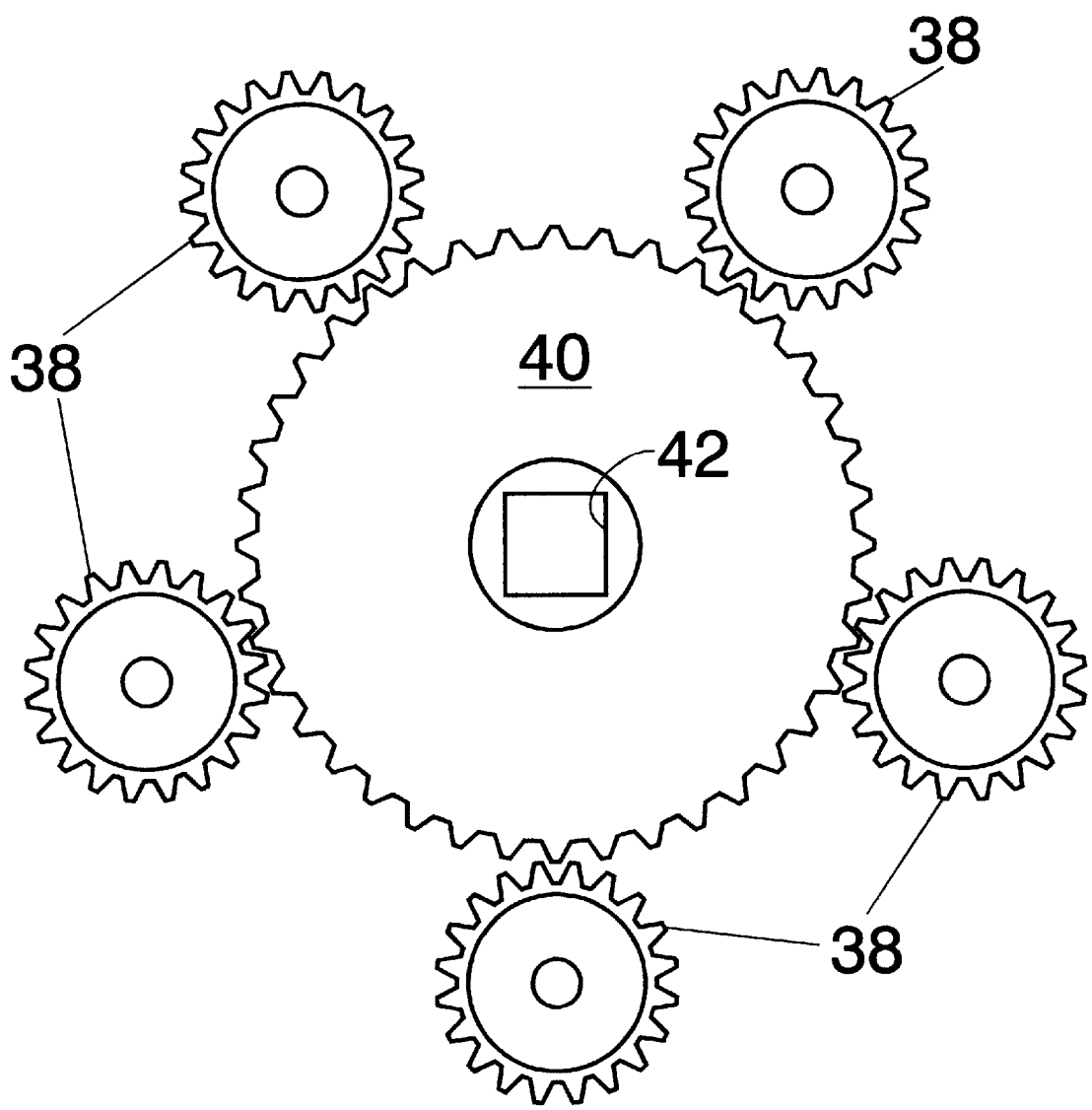
FIG. 4 is a schematic depiction of the universal drive gear within the housing engaging the satellite gears of the individual sockets as viewed from the back; and, FIG. 5 is a side view of the first embodiment of the multiple lug nut removal tool.

Each socket 30 has secured to a peripheral portion a satellite gear 38 which enables the sockets 30 to be simultaneously rotated. The five gears 38 engage a universal drive gear 40 (FIG. 4). Universal drive gear has a drive surface 42, depicted here as a square recess that permits a conventional ratchet extender to be inserted and used with a pneumatic wrench to rotate the universal drive gear 40 in a first rotational direction and, simultaneously, the five satellite gears 30 in an opposite rotational direction. It will be appreciated that alternatively, the drive surface could be formed as an integral post (not shown) with an external hex that could be directly engaged by the pneumatic wrench. Due to the gear arrangement, the pneumatic wrench will have to be operated in directions that are opposite to its normal modes, i.e., to remove the lug nuts, universal drive gear 40 will have to be rotated in a clockwise direction (which is normally the securing direction), which will, in turn, rotate the five sockets 30 in a counter-clockwise direction. The five lug nuts can be removed simultaneously, the new wheel with the replacement nuts glued to the wheel positioned on the lead end of the studs, and tool 20 used to simultaneously secure the replacement wheel to the vehicle.

Various changes, alternatives and modifications will become apparent to one of ordinary skill in the art following a reading of the foregoing specification. For example, each of the sockets 30 could be magnetized to retain the lug nuts therein, obviating the need to glue the lug nuts to the rims on the replacement wheels. It is intended that any such changes, alternatives and modifications as fall within the scope of the appended clams be considered part of the present invention.

I claim:

1. A multiple lug nut removal tool comprising
   a) multiple individual socket assemblies for simultaneously engaging each lug nut that attaches a wheel to a vehicle, each socket including a nut-engaging socket having a nut-engaging end and an opposite end and a satellite gear attached to each of said individual nut-engaging sockets intermediate said nut-engaging end and said opposite end for rotationally driving said individual nut-engaging socket in both rotational directions;
   b) a universal drive gear directly engaging each of said satellite gears for simultaneously rotating all of said individual socket assemblies in either of said rotational directions;
   c) a housing including an inner plate, an outer plate and a peripheral wall extending between said inner plate and said outer plate, said housing encasing said satellite gears, a portion of each socket, and said universal gear;
   d) a drive surface attached to said universal drive gear; whereby a pneumatic wrench engages said drive surface and, by rotating said drive surface in a direction opposite to a desired drive direction for said socket assemblies, simultaneously remove and replace all lug nuts securing the wheel.

2. The multiple lug nut removal tool of claim 1 wherein each of said individual socket assemblies farther comprises a locator pin extending from said opposite end of said individual nut-engaging socket said locator pin being received in an aperture in said outer plate of said housing.

3. The multiple lug nut removal tool of claim 1 wherein a number of lug nuts attaching the wheel to the wheel comprises five and said number of individual socket assemblies comprises five equally space about a pemneter portion of said housing, said housing being shaped as a pentagon to accommodate said five equally spaced socket assemblies.

4. The multiple lug nut removal tool of claim 1 further comprising a handle secured to said outer plate at two points to facilitate manipulation of said multiple lug nut removal tool during use.

5. The multiple lug nut removal tool of claim 1 wherein each individual nut-engaging socket is equipped with an internal 12 point recess for facilitating engagement of the nut.

6. The multiple lug nut removal tool of claim 1 wherein said drive surface comprises a recess for engagement by an extender secured to a pneumatic wrench.

7. A multiple lug nut removal tool for use in NASCAR racing comprising
   a) multiple individual socket assemblies for simultaneously engaging each lug nut that attaches a wheel to a vehicle, each socket including a nut-engaging socket having a nut-engaging end and an opposite end and a satellite gear attached to each of said individual nut-engaging sockets intermediate said nut-engaging end and said opposite end for rotationally driving said individual nut-engaging socket in both rotational directions;
   b) a universal drive gear directly engaging each of said satellite gears for simultaneously rotating all of said individual socket assemblies in either of said rotational directions;
   c) a housing including an inner plate, an outer plate and a peripheral wall extending between said inner plate and said outer plate, said housing encasing said satellite gears, a portion of each socket to ensure proper alignment thereof, and said universal gear;
   d) a drive surface attached to said universal drive gear; whereby a pneumatic wrench engages said drive surface and, by rotating said drive surface in a direction opposite to a desired drive direction for said socket assemblies, simultaneously remove and replace all lug nuts securing the wheel of a NASCAR vehicle.

8. The multiple lug nut removal tool for use in NASCAR racing of claim 7 wherein each of said individual socket assemblies further comprises a locator pin extending from said opposite end of said individual nut-engaging socket, said locator pin being received in an aperture in said outer plate of said housing.

9. The multiple lug nut removal tool for use in NASCAR racing of claim 7 further comprising a handle secured to said outer plate at two points to facilitate manipulation of said multiple lug nut removal tool during use.

* * * * *